United States Patent
Lee et al.

(10) Patent No.: US 12,300,792 B2
(45) Date of Patent: May 13, 2025

(54) BATTERY MODULE HAVING IMPROVED ASSEMBLABILITY AND BATTERY PACK INCLUDING THE SAME

(71) Applicant: LG ENERGY SOLUTION, LTD., Seoul (KR)

(72) Inventors: Jung-Hoon Lee, Daejeon (KR); Jae-Hun Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 355 days.

(21) Appl. No.: 17/780,669

(22) PCT Filed: Jul. 5, 2021

(86) PCT No.: PCT/KR2021/008528
§ 371 (c)(1),
(2) Date: May 27, 2022

(87) PCT Pub. No.: WO2022/035055
PCT Pub. Date: Feb. 17, 2022

(65) Prior Publication Data
US 2023/0010305 A1    Jan. 12, 2023

(30) Foreign Application Priority Data
Aug. 11, 2020 (KR) .................. 10-2020-0100768

(51) Int. Cl.
*H01M 10/42* (2006.01)
*H01M 10/48* (2006.01)
*H01M 50/284* (2021.01)

(52) U.S. Cl.
CPC ..... *H01M 10/4257* (2013.01); *H01M 10/486* (2013.01); *H01M 50/284* (2021.01); *H01M 2010/4271* (2013.01); *H01M 2220/20* (2013.01)

(58) Field of Classification Search
CPC .......... H01M 10/425; H01M 10/4257; H01M 10/48; H01M 10/482; H01M 10/486; H01M 2010/4271; H01M 50/284
See application file for complete search history.

(56) References Cited

U.S. PATENT DOCUMENTS 8,609,276 B2   12/2013  Han et al.
2015/0162648 A1  6/2015  Yang et al.
(Continued)

FOREIGN PATENT DOCUMENTS

CN      109478628 A    3/2019
EP      3 576 215 A1  12/2019
(Continued)

OTHER PUBLICATIONS

Clarivate Analytics machine translation of KR 10-2020-0015246 A (Year: 2020).*

(Continued)

*Primary Examiner* — Kevin E Yoon
(74) *Attorney, Agent, or Firm* — Birch, Stewart, Kolasch & Birch, LLP

(57) ABSTRACT

A battery module includes: a cell assembly including a plurality of battery cells and a cell housing in which the plurality of battery cells are accommodated; and a battery management system (BMS) assembly including a BMS circuit board, a BMS cover accommodating the BMS circuit board, and at least one temperature sensor module connected to the BMS circuit board and fixedly mounted on a rear surface of the BMS cover, the BMS assembly being mountably and detachably provided on a side surface of the cell housing, and the temperature sensor module contacts one of the plurality of battery cells.

15 Claims, 8 Drawing Sheets

(56) References Cited

U.S. PATENT DOCUMENTS

| | | | |
|---|---|---|---|
| 2015/0214583 A1 | 7/2015 | Lim et al. | |
| 2016/0105042 A1* | 4/2016 | Taylor | H01M 10/482 320/134 |
| 2017/0179542 A1 | 6/2017 | Cho et al. | |
| 2017/0250395 A1* | 8/2017 | Cheon | H01M 10/425 |
| 2019/0033377 A1 | 1/2019 | Karner et al. | |
| 2019/0334216 A1* | 10/2019 | Kim | H01M 50/569 |
| 2020/0194843 A1 | 6/2020 | Kwon et al. | |

FOREIGN PATENT DOCUMENTS

| | | |
|---|---|---|
| JP | 4-181661 A | 6/1992 |
| JP | 2008-304295 A | 12/2008 |
| JP | 2012-154901 A | 8/2012 |
| JP | 5344932 B2 | 11/2013 |
| JP | 2014-532958 A | 12/2014 |
| JP | 2015-8117 A | 1/2015 |
| JP | 2017-59503 A | 3/2017 |
| JP | 2018-528592 A | 9/2018 |
| KR | 10-0870457 B1 | 11/2008 |
| KR | 10-2013-0025245 A | 3/2013 |
| KR | 10-2014-0091123 A | 7/2014 |
| KR | 10-2016-0049863 A | 5/2016 |
| KR | 10-2017-0010974 A | 2/2017 |
| KR | 10-2017-0053429 A | 5/2017 |
| KR | 10-2018-0013460 A | 2/2018 |
| KR | 10-1839653 B1 | 3/2018 |
| KR | 10-2019-0051237 A | 5/2019 |
| KR | 10-2045528 B1 | 11/2019 |
| KR | 10-2020-0015246 A | 2/2020 |
| WO | WO 2012/157464 A1 | 11/2012 |
| WO | WO 2014/126339 A1 | 8/2014 |
| WO | WO-2019208938 A1 * | 10/2019 ........ H01M 10/4207 |

OTHER PUBLICATIONS

Clarivate Analytics machine translation of KR 10-2017-0010974 A (Year: 2017).*
International Search Report (PCT/ISA/210) issued in PCT/KR2021/008528 mailed on Nov. 1, 2021.
Extended European Search Report for European Application No. 21856062.1, dated Sep. 12, 2024.

* cited by examiner

RELATED ART

BATTERY MODULE HAVING IMPROVED ASSEMBLABILITY AND BATTERY PACK INCLUDING THE SAME

TECHNICAL FIELD

The present disclosure relates to a battery module, and more particularly, to a battery module having a stable and compact assembly structure of an electrical/electronic component such as a temperature sensor.

The present application claims priority to Korean Patent Application No. 10-2020-0100768 filed on Aug. 11, 2020 in the Republic of Korea, the present disclosures of which are incorporated herein by reference.

BACKGROUND ART

When a battery module including a plurality of secondary batteries is used, temperature control of the battery module may be very important. In particular, the battery module may be used in a high temperature environment such as in summer, and the secondary batteries themselves may generate heat. In this case, when the plurality of batteries are densely arranged, the temperature of the secondary batteries may further increase. When the temperature is higher than an appropriate temperature, the performance of the secondary batteries may be degraded and in severe cases, there is a risk of explosion or ignition. In contrast, when the temperature of the battery module is too low, the performance of the secondary batteries included in the battery module may be degraded. Accordingly, in order to prevent performance degradation or dangerous situations of the secondary batteries or prepare for such situations, the battery module includes a temperature sensor therein to continuously monitor the temperature of the secondary batteries.

Also, a recent battery module includes a battery management system (BMS) for monitoring and managing charging/discharging states of secondary batteries, and, as a means for sensing a voltage of each of the secondary batteries and transmitting the voltage to the BMS, a harness wire or a flexible printed circuit board (FPCB) capable of three-dimensional wiring and transmitting a number of signals.

For example, an existing battery module has a structure in which a connector 2, a temperature sensor 3, and a voltage sensing terminal (not shown) are mounted on a harness wire or an FPCB 1 as shown in FIG. 1 to connect each secondary battery cell 4, the temperature sensor 3 or the voltage sensing terminal, and the BMS 5.

However, the harness wire has the disadvantage in that it is not easy to assemble and perform wiring in a narrow space, and the FPCB more easily performs wiring than the harness wire but has the disadvantage of low durability and low economical efficiency due to high cost.

Also, many point out that a structure in which a thin and small FPCB or harness wire is attached to a secondary battery cell has low durability against impact and vibration and thus a sensing portion is likely to be separated or damaged.

Accordingly, there is a demand for a battery module having a more stable and economical assembly structure of an electrical/electronic component such as a temperature sensor than an existing structure.

DISCLOSURE

Technical Problem

The present disclosure is designed to solve the problems of the related art, and therefore the present disclosure is directed to providing a battery module having a stable and compact assembly structure of an electrical/electronic component such as a temperature sensor.

Technical problems to be solved by the present disclosure are not limited to the above-described technical problems and one of ordinary skill in the art will understand other technical problems from the following description.

Technical Solution

In one aspect of the present disclosure, there is provided a battery module including a cell assembly including a plurality of battery cells and a cell housing in which the plurality of battery cells are accommodated, and a battery management system (BMS) assembly including a BMS circuit board, a BMS cover accommodating the BMS circuit board, and a temperature sensor module connected to the BMS circuit board and fixedly mounted on a rear surface of the BMS cover, the BMS assembly being mountably and detachably provided on a side surface of the cell housing, wherein the temperature sensor module is configured to contact one of the plurality of battery cells.

Each of the plurality of battery cells may be a cylindrical battery cell, wherein a sensor connection hole is provided in the side surface of the cell housing to access the temperature sensor module, and the temperature sensor module is configured to contact the plurality of battery cells through the sensor connection hole.

The BMS cover may include a main cover covering the side surface of the cell housing and mounted on the cell housing, wherein the BMS circuit board is attached to a front surface of the main cover, and the temperature sensor module is attached to a rear surface of the main cover.

The BMS cover may further include a front cover covering the BMS circuit board and attached to the front surface of the main cover.

The BMS assembly may further include a plurality of sensing terminals mounted on an upper end portion of the main cover, spaced apart from one another by a certain interval, and each of the plurality of sensing terminals having one end portion connected to the BMS circuit board.

The cell assembly may further include sensing plates extending parallel to one another from a first end of an upper end portion of the cell housing to a second end of the upper end portion of the cell housing and the plurality of battery cells under the plurality of sensing plates are electrically connected to the plurality of sensing plates located at positions corresponding to the plurality of battery cells, and end portions of the plurality of sensing plates are respectively connected to the plurality of sensing terminals.

The temperature sensor module may include a thermistor, a sensor wire extending from the thermistor and connected to the BMS circuit board, and a sensor case supporting the thermistor and press-fitted onto the main cover.

The sensor case may include a front portion including a receiving groove into which the thermistor is inserted and an insertion plate that is inserted into a sensor slot formed in the main cover, and a rear portion having a curved surface.

The temperature sensor module may further include a spacer formed of a compressed foam material, the spacer being fitted around the insertion plate and disposed between the sensor case and the main cover.

The cell housing may include a cell tray provided so that each of the plurality of battery cells is inserted and erected, and a tray cover vertically coupled to the cell tray to fix and protect the plurality of battery cells, wherein the sensor connection hole is provided in the tray cover.

In another aspect of the present disclosure, there is also provided a battery pack including the battery module.

Advantageous Effects

According to an aspect of the present disclosure, a battery module having a stable and compact assembly structure of an electrical/electronic component such as a temperature sensor may be provided.

The effects of the present disclosure are not limited to the effects mentioned above, and other effects not mentioned will be clearly understood by those skilled in the art from the specification and the attached drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
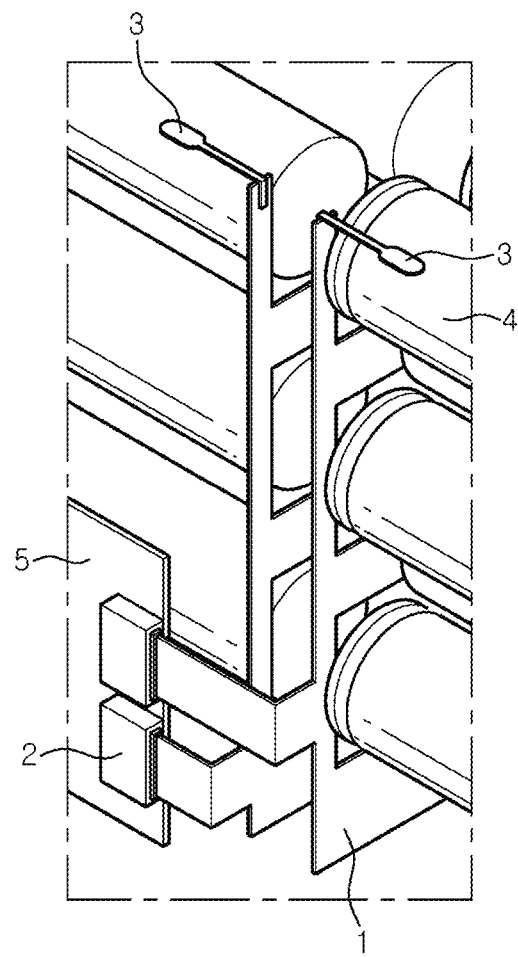
FIG. 1 is a view illustrating an assembly structure of a temperature sensor, a sensing cable, and a BMS in a battery module, according to the prior art.
Figure 2:
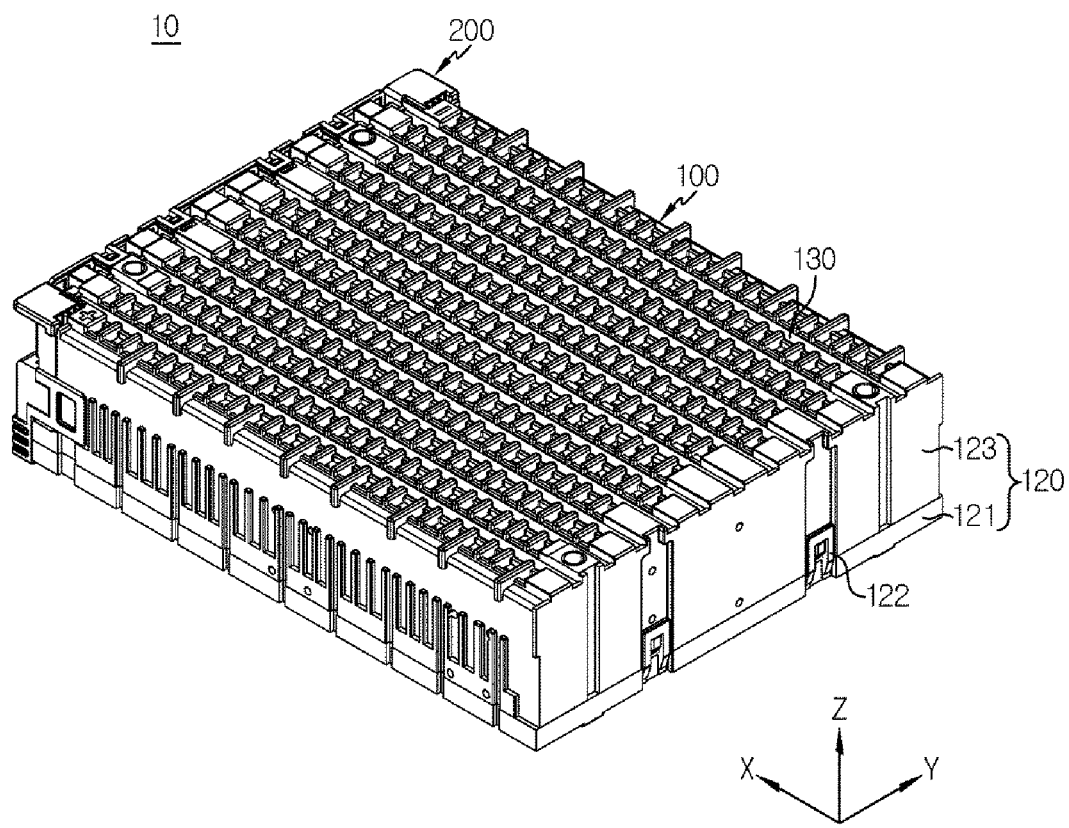
FIG. 2 is a perspective view illustrating a battery module, according to an embodiment of the present disclosure.
Figure 3:
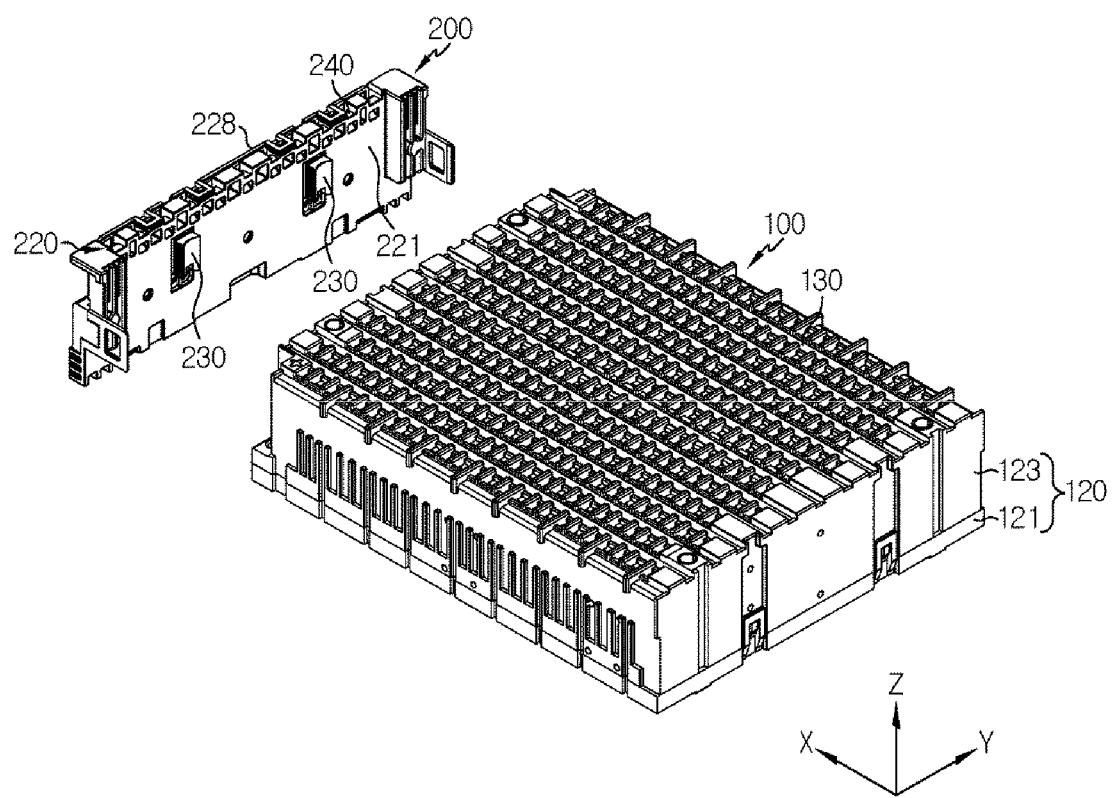
FIG. 3 is a view illustrating a state in which a battery management system (BMS) assembly is detached from a cell assembly of the battery module of FIG. 2.
Figure 4:
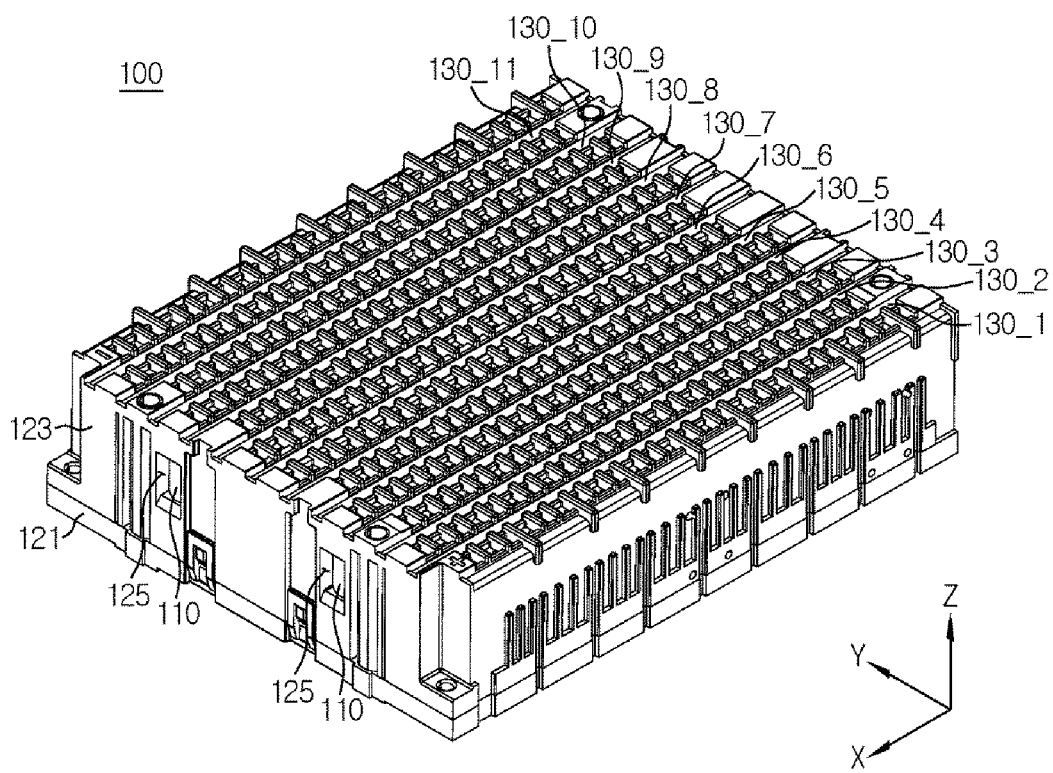
FIG. 4 is a view illustrating the cell assembly of FIG. 3 seen from a different direction.

FIG. 2 is a perspective view illustrating a battery module, according to an embodiment of the present disclosure. FIG. 3 is a view illustrating a state in which a BMS assembly is detached from a cell assembly of the battery module of FIG. 2. FIG. 4 is a view illustrating the cell assembly of FIG. 3 seen from a different direction.

Referring to FIGS. 2 through 4, a battery module 10 according to an embodiment of the present disclosure includes a cell assembly 100 and a BMS assembly 200 mountably and detachably provided on the cell assembly 100.

As described below in detail, because the battery module 10 according to the present disclosure has a structure in which a temperature sensor module 230 directly contacts a battery cell 110 in a process of assembling the cell assembly 100 and the BMS assembly 200, when compared to the battery module according to the prior art, a temperature sensing structure is very simple and a harness wire or an expensive flexible printed circuit board (FPCB) which was used to mount a temperature sensor does not need to be used, thereby greatly increasing economical efficiency.

The cell assembly 100 of the battery module 10 will be first described. The cell assembly 100 includes a plurality of battery cells 110 and a cell housing 120 in which the plurality of battery cells 110 are accommodated.

The battery cell 110 applied to the battery module 10 of the present embodiment is a cylindrical battery cell 110 in which an electrode assembly is embedded in a metal can. The cylindrical battery cell 110 may include a battery can having a cylindrical shape and mainly made of a lightweight conductive metal material such as aluminum, a jelly-roll type electrode assembly accommodated in the battery cell, and a cap assembly coupled to an upper portion of the battery can. The cap assembly is connected to a positive electrode tab of the electrode assembly and functions as a positive electrode terminal, and a lower end of the battery is connected to a negative electrode tab of the electrode assembly and functions as a negative electrode terminal.

The cylindrical battery cells 110 may be inserted into the cell housing 120, and metal plates (not shown) may be spot-welded in a pre-determined pattern to upper or lower ends of the cylindrical battery cells 110 so that the cylindrical battery cells 110 are connected to one another in series and/or in parallel.

However, the scope of the present disclosure should not be construed as being limited to the battery module 10 using the cylindrical battery cell 110. For example, the battery module 10 according to the present disclosure may include a prismatic battery cell 110 having a rectangular battery can shape, instead of a cylindrical shape.

The cell housing 120 for fixing and protecting the battery cells 110 may include a cell tray 121 and a tray cover 123.

The cell tray 121 may have a quadrangular plate shape, may include sockets formed inside an outer edge, and may be provided so that lower end portions of the battery cells 110 are respectively inserted into the sockets to be erected. Also, the cell tray 121 may include a catch 122 on the outer edge, and may be snap-fitted onto the tray cover 123.

The tray cover 123 may include sockets into which upper end portions of the battery cells 110 may be inserted, and may be provided in a box shape so that the battery cells 110 and an upper portion of the cell tray 121 are covered.

The tray cover 123 according to the present embodiment further includes sensing plates 130 on an upper end portion thereof. The sensing plates 130 may be spaced apart from one another by a certain interval (±Y axis direction) and may extend parallel to one another (±X axis direction) from one end of the upper end portion of the tray cover 123 to the other end of the upper end portion of the tray cover 123.

The battery cells 110 under the sensing plates 130 may be electrically connected to the sensing plates 130 located at positions corresponding to the battery cells 110. Referring to FIG. 4, the battery cells 110 may be arranged in the cell housing 120 in the Y axis direction in first through $12^{th}$ columns, and the battery cells 110 in the same column may be connected in parallel and the battery cells 110 in adjacent columns may be connected in series. One sensing plate 130 is located between adjacent battery cell columns and thus a total of 11 sensing plates 130 are arranged. The sensing plate 130 senses a bank voltage of a series connection portion of the battery cells 110.

A voltage sensed by the sensing plate 130 may be transmitted to a BMS circuit board 210 through a sensing terminal 240 of the BMS assembly 200 described below.

Referring back to FIG. 4, the tray cover 123 further includes a sensor connection hole 125. The sensor connection hole 125 is a passage through which the temperature sensor module 230 may access the battery cell 110 located inside the cell housing 120, and may be formed in a side surface of the tray cover 123 on which the BMS assembly 200 is to be mounted.

Figure 5:
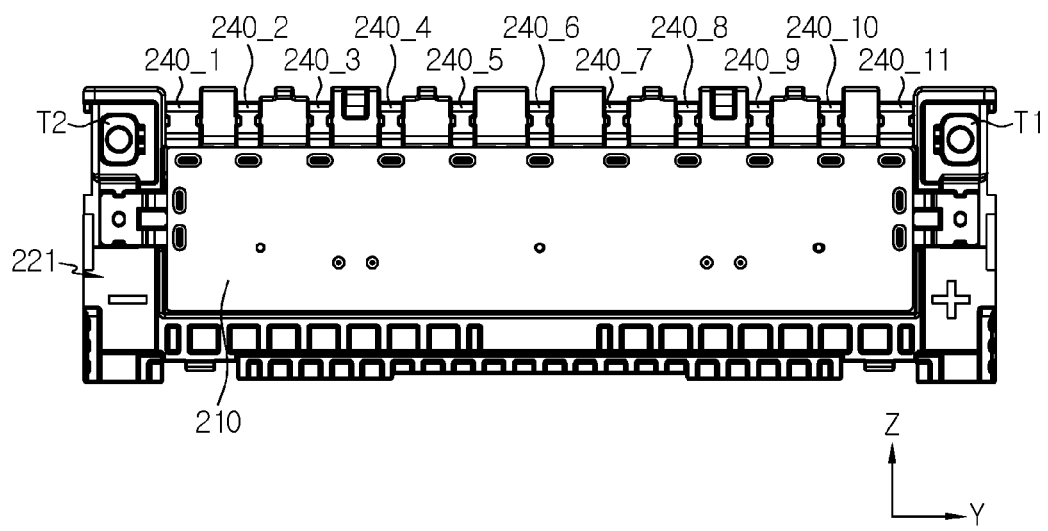
FIG. 5 is a front view illustrating the BMS assembly from which a front cover is removed, according to an embodiment of the present disclosure.
Figure 6:
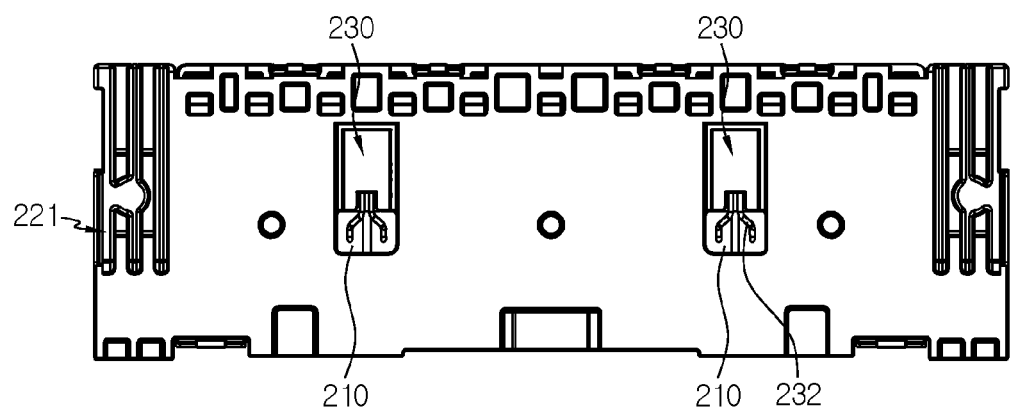
FIG. 6 is a rear view illustrating the BMS assembly of FIG. 5.
Figure 7:
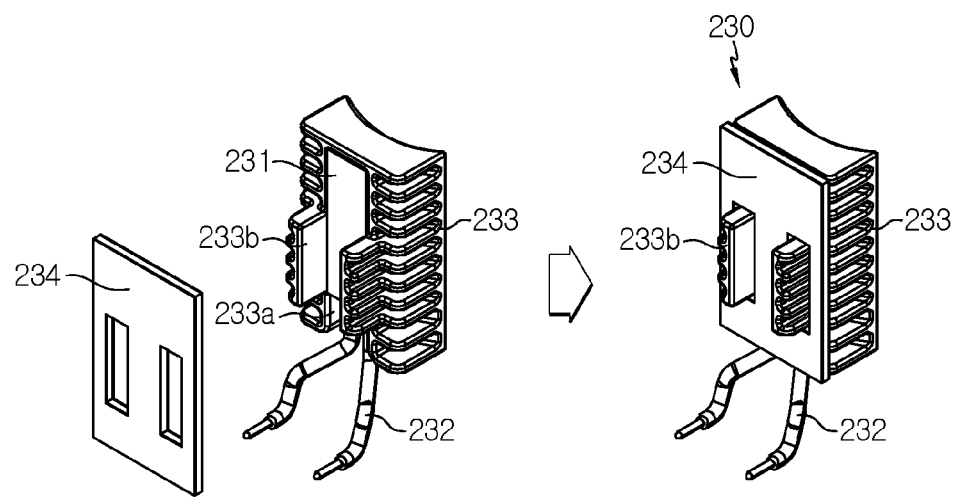
FIG. 7 is a view illustrating elements of a temperature sensor module, according to an embodiment of the present disclosure.
Figure 8:
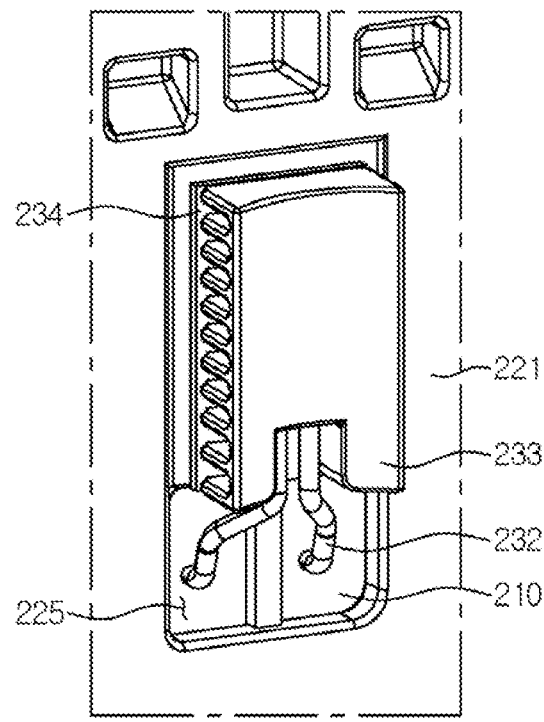
FIGS. 8 and 9 are views illustrating an assembly structure of the temperature sensor module and a main cover, according to an embodiment of the present disclosure.
Figure 9:
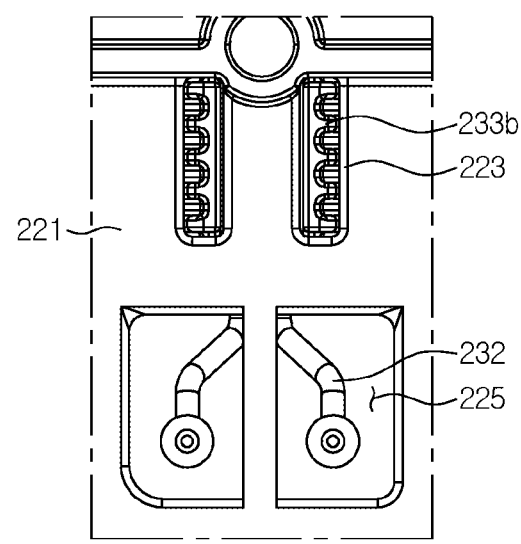

FIG. 5 is a front view illustrating the BMS assembly 200 from which a front cover 228 is removed, according to an embodiment of the present disclosure. FIG. 6 is a rear view illustrating the BMS assembly 200 of FIG. 5. FIG. 7 is a view illustrating elements of the temperature sensor module 230, according to an embodiment of the present disclosure. FIGS. 8 and 9 are views illustrating an assembly structure of the temperature sensor module 230 and a main cover 221, according to an embodiment of the present disclosure.

Referring to FIGS. 5 through 9, the BMS assembly 200 includes the BMS circuit board 210, a BMS cover 220, a plurality of temperature sensors 230, and a plurality of sensing terminals 240.

The BMS circuit board 210 is a component for diagnosing, estimating, and managing states of the battery cells 110. The temperature sensor module 230, a voltage sensing component, a current sensor, etc. may be directly or indirectly connected to the BMS circuit board 210 to transmit signals such as a temperature, a voltage, and current of the battery cell 110.

The BMS cover 220 of the present embodiment is a structure for protecting the BMS circuit board 210 from the outside and fixing the BMS circuit board 210 not to move, and includes the main cover 221 and a front cover 228.

The main cover 221 may support the BMS circuit board 210, may be mountably and detachably provided on the cell housing 120, may be used as a place where an electrode terminal or the like of the battery module 10 may be assembled, and may be provided as a structure having a plate shape and an area large enough to cover a side surface of the cell housing 120.

A positive electrode terminal T1 and a negative electrode terminal T2 of the battery module 10 as well as the BMS circuit board 210, the temperature sensor module 230, and the plurality of sensing terminals 240 may be mounted on the main cover 221.

The BMS circuit board 210 may be attached to the center of a front surface of the main cover 221, as shown in FIG. 5. A bolt or hook fastening structure may be used, to fix the BMS circuit board 210 to the main cover 221.

The front cover 228 may also be attached to the front surface of the main cover 221 on which the BMS circuit board 210 is mounted to cover a front portion of the BMS circuit board 210, thereby protecting the front portion of the BMS circuit board 210 from the outside.

Referring to FIGS. 6 and 7, the temperature sensor module 230 is mounted on a rear surface of the main cover 221, and includes a thermistor 231, a sensor wire 232, a sensor case 233, and a spacer 234.

The thermistor 231 may be a positive temperature coefficient (PTC) thermistor whose resistance increases as a temperature increases or a negative temperature coefficient (NTC) thermistor whose resistance decreases as a temperature increases. It is well known that the thermistor 231 functions as a sensor for converting a thermal signal into an electrical signal, and thus a detailed description of the thermistor 231 will be omitted.

The sensor wire 232 is a portion for transmitting an electrical signal of the thermistor 231 to the BMS circuit board 210, and an end portion of the sensor wire 232 may be soldered to the BMS circuit board 210.

The sensor case 233 is a component supporting the thermistor 231 and mountably provided on the main cover 221. The sensor case 233 includes a front portion including a receiving groove 233a into which the thermistor 231 may be inserted and an insertion plate 233b that may be inserted into a sensor slot 223 formed in the main cover 221, and a rear portion having a curved surface.

To fix the sensor case 233 and connect the thermistor 231 to the BMS circuit board 210, a sensor slot 223 and a board connector 225 under the sensor slot 223 may be formed to pass through the main cover 221, as shown in FIGS. 8 and 9.

The sensor slot 223 may be sized so that, when the insertion plate 233b of the sensor case 233 is inserted into the sensor slot 223, the insertion plate 233b is tightly fitted and does not move, and the board connector 225 may be sized so that the sensor wire 232 is freely taken out and soldering on the BMS circuit board 210 is easily performed.

The spacer 234 may be further provided on the front portion of the sensor case 233. The spacer 234 may be fitted as a compressed foam or pad around the insertion plate 233b and may be attached to the front portion of the sensor case 233. The spacer 234 may be attached to the sensor case 233 by using a double-sided adhesive tape. The double-sided adhesive tape may be provided on both surfaces of the spacer 234.

The spacer 234 may be located between a front surface of the sensor case 233 and a rear surface of the main cover 221 when the insertion plate 233b of the temperature sensor module 230 is inserted into the sensor slot 223 of the main cover 221, and may absorb impact between components and may offset an interval tolerance between the temperature sensor module 230 and the battery cell 110 while the cell assembly 100 and the BMS assembly 200 are assembled.

Next, an attachment structure between the temperature sensor module 230 and the battery cell 110 according to an embodiment of the present disclosure will be described with reference to FIGS. 10 and 11 together with FIG. 4.

According to the present embodiment, two temperature sensor modules 230 are mounted on a rear surface of the main cover 221, one on the left and the other on the right of the center of the main cover 221. Unlike in the present embodiment, one, or three or more temperature sensor modules 230 may be provided, or locations of the temperature sensor modules 230 may be changed.

Figure 10:
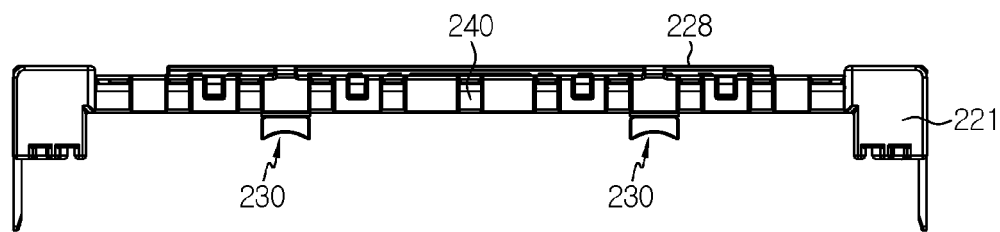
FIG. 10 is a top view illustrating a BMS assembly, according to an embodiment of the present disclosure.

When the BMS assembly is viewed from the top as shown in FIG. 10, the temperature sensor module 230 slightly protrudes in a direction in which the sensor case 233 on the rear surface of the main cover 221 is mounted on the cell assembly 100. The sensor connection holes 125 are formed at positions corresponding to the temperature sensor modules 230, in a side portion of the cell housing 120 on which the main cover 221 is to be mounted, in other words, in a side portion of the tray cover 123 to be covered by the main cover 221 (see FIG. 4).

Figure 11:
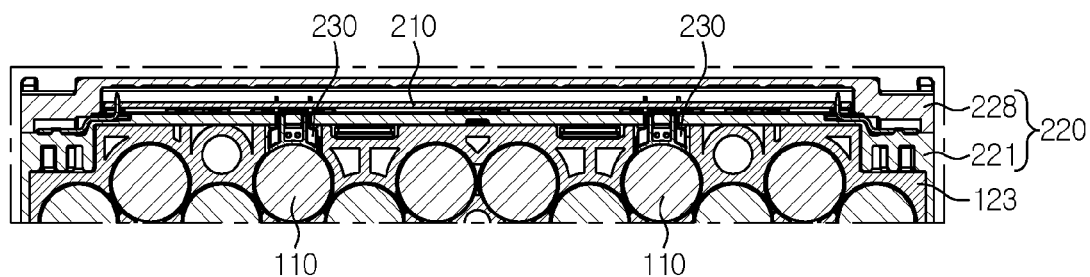
FIG. 11 is a partial cross-sectional view illustrating a battery module, according to an embodiment of the present disclosure, particularly illustrating an attachment structure between a temperature sensor module and a battery cell.

Hence, when the main cover 221 is mounted on the side portion of the cell housing 120, as shown in FIG. 11, the temperature sensor module 230 may be introduced into the cell housing 120 through the sensor connection hole 125 of the tray cover 123 and a curved portion of the temperature sensor module 230 may contact and surround an outer circumferential surface of the cylindrical battery cell 110. When a thermally conductive adhesive is previously applied to a curved surface of the temperature sensor module 230, adhesion between the temperature sensor module 230 and the cylindrical battery cell 110 may be increased and thermal contact resistance may be reduced.

As such, because the battery module 10 of the present disclosure may bring the temperature sensor module 230 into contact with the battery cell 110 without much effort in a process of assembling the BMS assembly 200 and the cell assembly 100, assembly and installation of a temperature sensor is much easier and a structure for assembling and installing the temperature sensor is simpler when compared to the battery module according to the prior art. Also, since the temperature sensor module 230 according to the present disclosure is installed as a mechanically firmly coupled structure, there is little risk that the temperature sensor module 230 is damaged or separated from the battery cell 110 even by an external force (e.g., impact or vibration).

Figure 12:
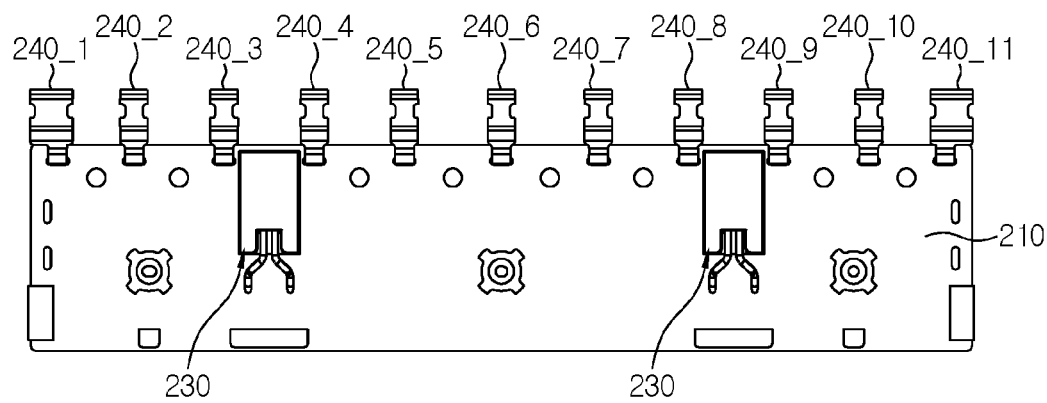
FIG. 12 is a view illustrating a connection structure between a BMS circuit board and sensing terminals, according to an embodiment of the present disclosure.

The BMS assembly 200 further includes a plurality of sensing terminals 240. The plurality of sensing terminals 240 are mounted on an upper end portion of the main cover 221 and are spaced apart from one another by a certain interval, as shown in FIGS. 5, 10, and 12. One end portion of each of the sensing terminals 240 may be connected to the BMS circuit board 210 by using soldering or the like. For example, 11 sensing terminals 240_1, . . . , 240_11 may be arranged at almost regular intervals from a left end of the upper end portion of the main cover 221 to a right end of the upper end portion of the main cover 221, and one end portion of each of the sensing terminals 240_1, . . . , 240_11 may be inserted into a rear surface of the BMS circuit board 210 and fixedly soldered from a front surface.

Figure 13:
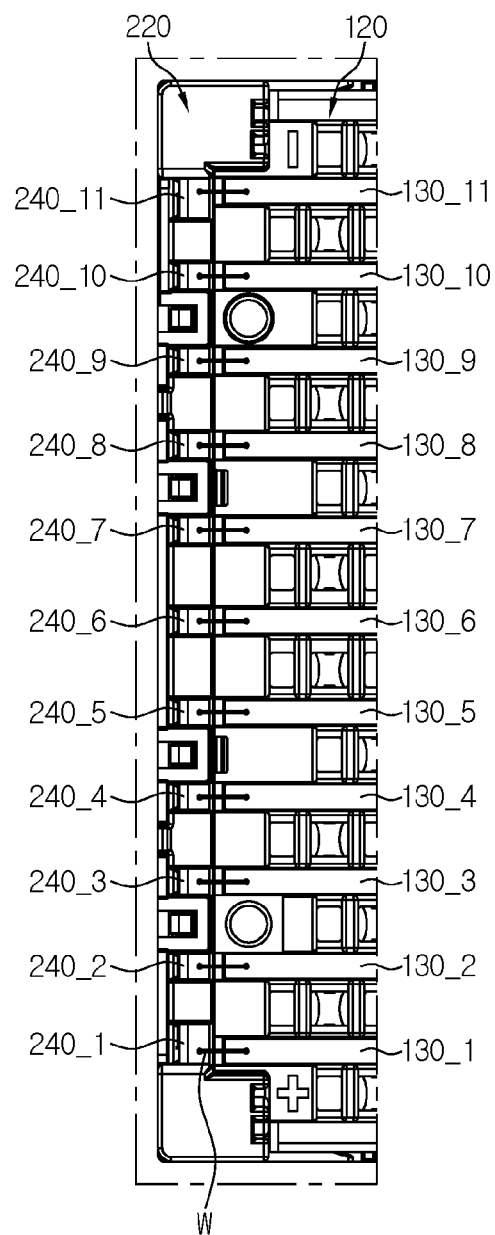
FIG. 13 is a view illustrating a connection structure between sensing terminals and metal plates, according to an embodiment of the present disclosure.

As shown in FIGS. 13, the plurality of sensing terminals 240_1, . . . , 240_11 may be connected in a one-to-one correspondence manner to end portions of sensing plates 130_1, . . . , 130_11 extending from one end of an upper end portion of the cell housing 120 to the other end of the upper end portion of the cell housing 120. That is, the 11 sensing plates 130_1, . . . , 130_11 provided in an upper portion of the cell assembly 100 may be connected in a one-to-one correspondence manner to the 11 sensing terminals 240_1, . . . , 240_11 provided in an upper portion of the BMS assembly 200.

When the sensing terminals 240_1, . . . , 240_11 and the sensing plates 130_1, . . . , 130_11 are connected to each other, for example, one end and the other end of a short conductor cable W or metal strap may be connected to the sensing terminals 240_1, . . . , 240_11 and the sensing plates 130_1, . . . , 130_11 by using a method such as fusion, bonding, welding, or bolting.

The 11 sensing plates 30_1, . . . , 130_11 sense a value of a node voltage of a place where the battery cells 110 are connected in series, and transmit the value of the node voltage to the BMS circuit board 210. The BMS circuit board 210 may control charging/discharging by monitoring voltage states of the battery cells 110 based on the voltage information. In this case, the 11 sensing terminals 240_1, . . . , 240_11 may be components used as intermediate means for connecting the 11 sensing plates 130_1, . . . , 130_11 to the BMS circuit board 210.

For example, the present disclosure may have a structure in which all of the sensing plates 130 are located in the upper portion of the cell assembly 100, and in order to easily connect the sensing plates 130 to the BMS circuit board 210, the sensing terminals 240 end portions of which are previously soldered to the BMS circuit board 210 are located on the upper end portion of the main cover 221.

This assembly structure for voltage sensing may be capable of simple and compact wiring, even without using a voltage sensing component such as a conventional expensive FPCB, and may be structurally stable and thus may prevent components from being easily damaged by an external force (e.g., impact or vibration).

Although not shown, the battery module 10 may further include a heat sink located under the cell assembly 100. The heat sink is a component for indirectly cooling the battery cells 110 by passing a cooling fluid through an internal fluid path and absorbing heat from the cell tray 120 through thermal contact, and the heat sink may be located to contact a bottom surface of the cell tray 121. The cooling fluid flowing through the fluid path is not limited and may be any fluid as long as it easily flows through the fluid path and has excellent cooling properties. For example, the cooling fluid may be water having high latent heat and capable of maximizing cooling efficiency. However, the present disclosure is not limited thereto, and as long as it flows, an anti-freezing solution, a gas refrigerant, or air may be applied.

A battery pack according to the present disclosure may include one or more battery modules 10. Also, the battery pack according to the present disclosure may further include a pack case for accommodating the battery module 10, and various devices for controlling charging/discharging of the battery module 10, for example, a master BMS, a current sensor, and a fuse, in addition to the battery module 10.

The battery module 10 according to the present disclosure may be applied to an electric scouter, a vehicle such as an electric vehicle or a hybrid vehicle, or an energy storage system (ESS).

The present disclosure has been described in detail. However, it should be understood that the detailed description and specific examples, while indicating preferred embodiments of the present disclosure, are given by way of illustration only, since various changes and modifications within the scope of the present disclosure will become apparent to those skilled in the art from this detailed description.

It will be understood by one of ordinary skill in the art that when terms indicating directions such as upper, lower, left, right, front, and rear are used, these terms are only for convenience of explanation and may vary according to a position of a target object, a position of an observer, etc.

What is claimed is:
1. A battery module comprising:
a cell assembly comprising a plurality of battery cells and a cell housing in which the plurality of battery cells are accommodated; and
a battery management system (BMS) assembly including:
a BMS circuit board;

a BMS cover accommodating the BMS circuit board;
a plurality of sensing terminals mounted on an upper end portion of the BMS cover; and
a temperature sensor module connected to the BMS circuit board and fixedly mounted on a rear surface of the BMS cover, the BMS assembly being mountably and detachably provided on a side surface of the cell housing,
wherein, the temperature sensor module is configured to contact one of the plurality of battery cells, and
wherein the temperature sensor module is disposed between adjacent sensing terminals of the plurality of sensing terminals.

2. The battery module of claim 1, wherein each of the plurality of battery cells is a cylindrical battery cell, and
wherein a sensor connection hole is provided in the side surface of the cell housing to access the temperature sensor module, and the temperature sensor module is configured to contact the plurality of battery cells through the sensor connection hole.

3. The battery module of claim 2, wherein the cell housing comprises:
a cell tray provided so that each of the plurality of battery cells is inserted and erected; and
a tray cover vertically coupled to the cell tray to fix and protect the plurality of battery cells, and
wherein the sensor connection hole is provided in the tray cover.

4. The battery module of claim 1, wherein the BMS cover comprises a main cover covering the side surface of the cell housing and mounted on the cell housing, and
wherein the BMS circuit board is attached to a front surface of the main cover, and the temperature sensor module is attached to a rear surface of the main cover.

5. The battery module of claim 4, wherein the BMS cover comprises a front cover covering the BMS circuit board and attached to the front surface of the main cover.

6. The battery module of claim 4, wherein the plurality of sensing terminals are mounted on an upper end portion of the main cover, spaced apart from one another, and each of the plurality of sensing terminals having one end portion connected to the BMS circuit board.

7. The battery module of claim 6, wherein the cell assembly comprises sensing plates extending parallel to one another from a first end of an upper end portion of the cell housing to a second end of the upper end portion of the cell housing, and
wherein the plurality of battery cells under the plurality of sensing plates are electrically connected to the plurality of sensing plates located at positions corresponding to the plurality of battery cells, and end portions of the plurality of sensing plates are respectively connected to the plurality of sensing terminals.

8. The battery module of claim 4, wherein the temperature sensor module comprises:
a thermistor;
a sensor wire extending from the thermistor and connected to the BMS circuit board; and
a sensor case supporting the thermistor and press-fitted onto the main cover.

9. The battery module of claim 8, wherein the sensor case comprises:
a front portion including:
a receiving groove into which the thermistor is inserted; and
an insertion plate that is inserted into a sensor slot formed in the main cover; and
a rear portion having a curved surface.

10. The battery module of claim 9, wherein the temperature sensor module comprises a spacer formed of a compressed foam material, the spacer being fitted around the insertion plate and disposed between the sensor case and the main cover.

11. The battery module of claim 1, further comprising a plurality of temperature sensor modules, the plurality of temperature sensor modules including the temperature sensor module connected to the BMS circuit board,
wherein each temperature sensor module is disposed between adjacent sensing terminals of the plurality of sensing terminals.

12. The battery module of claim 11, wherein the plurality of temperature sensor modules are disposed in a lengthwise direction of the BMS circuit board.

13. The battery module of claim 12, wherein each temperature sensor module comprises at least two sensor wires connected to the BMS circuit board.

14. The battery module of claim 1, wherein each of the plurality of sensing terminals are disposed above the BMS circuit board.

15. A battery pack comprising the battery module according to claim 1.

* * * * *